US012698672B2

(12) United States Patent
Wang

(10) Patent No.: US 12,698,672 B2
(45) Date of Patent: Aug. 4, 2026

(54) CLOSURE ASSEMBLY

(71) Applicant: Nan Ya Plastics Corporation, Taipei City (TW)

(72) Inventor: Kuei-Yung Wang, Taipei City (TW)

(73) Assignee: Nan Ya Plastics Corporation (TW)

( * ) Notice: Subject to any disclaimer, the term of this patent is extended or adjusted under 35 U.S.C. 154(b) by 0 days.

(21) Appl. No.: 19/280,590

(22) Filed: Jul. 25, 2025

(65) Prior Publication Data

US 2025/0347168 A1 Nov. 13, 2025

(51) Int. Cl.
*E06B 1/52* (2006.01)
*E06B 3/36* (2006.01)

(52) U.S. Cl.
CPC .............. *E06B 1/526* (2013.01); *E06B 3/365* (2013.01)

(58) Field of Classification Search
CPC ........... E06B 1/526; E06B 3/365; E06B 3/362
See application file for complete search history.

(56) References Cited

U.S. PATENT DOCUMENTS 4,167,088 A * 9/1979 Governale .............. E06B 1/524 49/501
5,056,263 A * 10/1991 Bies ...................... E06B 7/2312 49/470
6,374,545 B1 * 4/2002 Baczuk ................. E06B 7/2316 49/492.1
7,140,154 B2 * 11/2006 Governale .............. E06B 1/524 52/716.2
8,393,115 B2 * 3/2013 Schroder ............... E06B 7/2305 49/504
9,556,665 B2 * 1/2017 Ritzert ....................... E06B 3/10
10,975,611 B2 * 4/2021 Kendall .................. E05C 7/045
12,123,253 B2 * 10/2024 Ortega .................... E06B 3/984

* cited by examiner

*Primary Examiner* — Muhammad Ijaz
*Assistant Examiner* — Susan M. Heschel
(74) *Attorney, Agent, or Firm* — OSTROLENK FABER LLP

(57) ABSTRACT

A closure assembly including a pair of closure members with one designated as an active closure member and the other as a passive closure member, and an astragal provided with the passive closure member, which is configured to cover a gap between the closure members when the closure assembly is in a closed position. There is a pair of sweep receivers each mounted on at least one of the closure members at opposite ends and each closure member having substantially the same thickness about its horizontal midline, such that each closure member can be configured as either a right or left closure member by adjusting its orientation.

14 Claims, 15 Drawing Sheets

CLOSURE ASSEMBLY

TECHNICAL FIELD

Embodiments disclosed herein relate to closure systems. More particular, embodiments disclosed herein relate to a closure assembly with double closure members.

BACKGROUND

Double door closure assembly is well-known in the art, valued for its ability to create wider entryways and enhance the aesthetic appeal of residential and commercial spaces. These systems comprise an active closure panel with a primary handle and locking mechanism, paired with a passive closure panel that remains fixed unless manually released.

A key limitation of these assemblies is that their configuration must be predetermined, including specifying whether the active or passive door is on the right and whether it operates as a left- or right-hand swing. This lack of flexibility creates challenges for manufacturers, suppliers, and customers, such as homeowners, who must maintain an inventory of various preconfigured units. Once an order is placed, the design cannot be modified, which limits adaptability during installation to accommodate on-site needs or preferences.

SUMMARY OF THE INVENTION

According to a first aspect of the present invention, there is provided a closure assembly comprising: a pair of closure members with one designated as an active closure member and the other as a passive closure member; and an astragal provided with the passive closure member, configured to cover a gap between the closure members when the closure assembly is in a closed position; wherein, a pair of sweep receivers each mounted on at least one of the closure members at opposite ends and each closure member having substantially the same thickness about its horizontal midline, such that each closure member can be configured as either a right or left closure member by adjusting its orientation.

In an embodiment, each sweep receiver comprises one or more complementary members configured to couple with a door sweep.

In an embodiment, the complementary members comprise one or more grooves configured in complementary with a protruding member of the door sweep.

In an embodiment, the sweep receivers are configured to form a snap-fit connection with the door sweep.

In an embodiment, at least one end of the astragal comprises a cover receiver, configured to couple with a cover.

In an embodiment, at least one of the closure members comprises a handle receiver configured to couple with a handle, enabling operation in different orientations.

In an embodiment, at least one of the closure members comprises one or more strike plate receivers configured to couple with one or more strike plates, enabling operation in different orientations.

In an embodiment, wherein at least one of the handle receiver and the strike plate receiver is positioned substantially in the middle portion of respective closure members.

In an embodiment, at least one of the closure members comprises a pair of wind stopper receivers at opposite ends.

In an embodiment, any one of the cover receiver, the handle receiver, the strike plate receiver and the wind stopper receiver comprises screw threads to ensure secure coupling.

In an embodiment, at least one of the closure members comprises a glass coupler, configured to couple with a glass panel.

In an embodiment, the closure assembly further comprising a closure frame, to which the closure members are coupled.

In an embodiment, each closure member can be configured to be hinged on either the right or left side of the closure frame.

Unless otherwise specified, terms of degree such as "generally", "about", "substantially", etc., are intended to account for one or more of: manufacture tolerance, degradation, trend, tendency, imperfect practical condition(s), etc. For example, expressions such as "generally perpendicular", "generally parallel", "generally circumferential", and the like are intended to allow for slight deviations or inconsistencies in practice (e.g., in which a strictly perpendicular arrangement, a strictly parallel arrangement, or a strictly circumferential arrangement may not be possible and/or may not be necessary).

Further, unless otherwise specified, terms such as "connected" and "coupled" are intended to encompass both direct and indirect connection and coupling.

BRIEF DESCRIPTION OF THE DRAWINGS

Embodiments will now be described, by way of example, with reference to the accompanying figures in which.

DETAILED DESCRIPTIONS OF THE EMBODIMENTS

Embodiments disclosed herein generally relate to a closure assembly such as a double door system, for use as an entry to a room. The disclosed closure assembly comprises a pair of closure members, with one designated as an active closure member and the other as a passive closure member. The passive closure member is provided with a cover member, for example an astragal, which extends over the edge of the active closure member to cover the clearance gap between the two closure members. At least one of the closure members is mounted with a pair of sweep receivers at opposite ends, i.e. at both the top and bottom edges. This allows each closure member to be configured as either a right or left closure member by adjusting its orientation.

The disclosed closure assembly enables flexible on-site installation; a user can choose to configure either the left-hand swing or the right-hand according to the user's preference, such as their dominant hand and habits. Unlike a traditional double door assembly where the configuration is determined during manufacturing, i.e. the active closure member is on the right and the passive closure member the left, or vice versa, the closure members of the disclosed embodiments are each configured to be used in either an upright or reversed orientation, enabling them to be configured as either the right or left closure member of the assembly.

Figure 1:
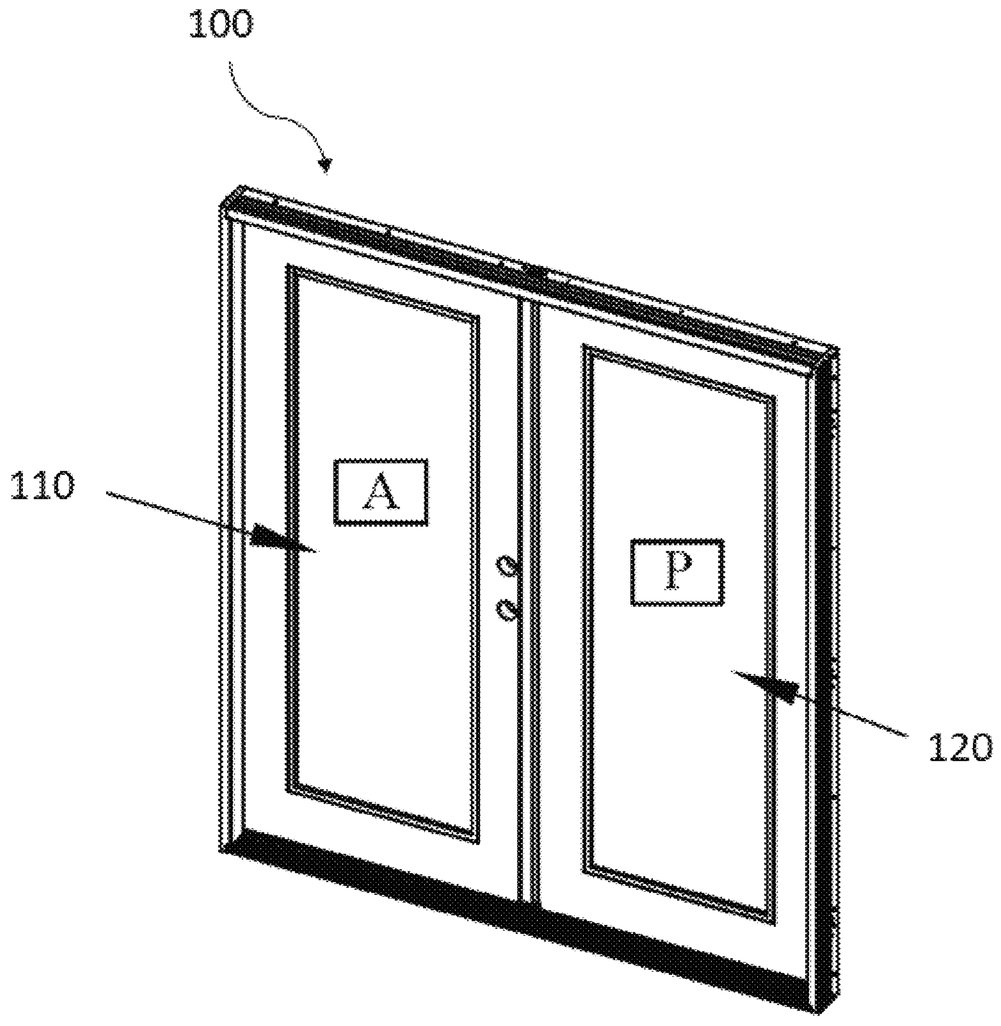
FIG. 1 shows a perspective view of an embodiment of a closure assembly according to the present invention.
Figure 2A:
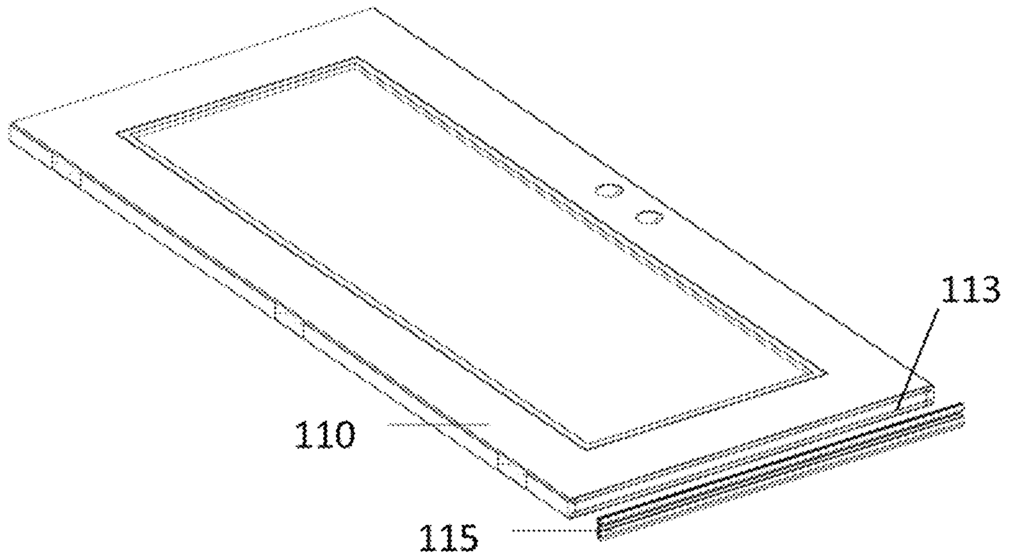
FIG. 2*a* shows a perspective view of an active closure member, which is designed to couple with a door sweep at opposite ends.
Figure 2B:
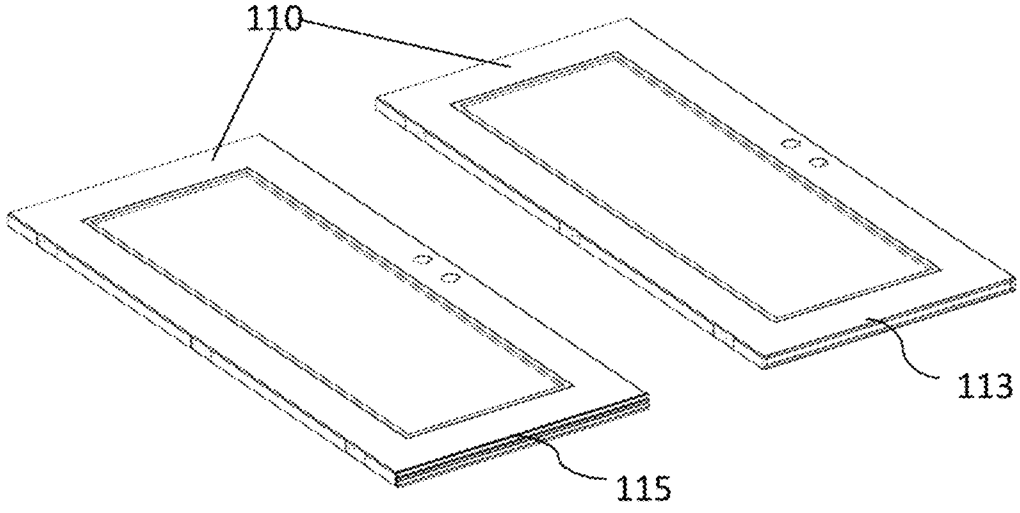
FIG. 2*b* shows a representation of the active closure member of FIG. 2*a*, with and without the door sweep being installed thereto.

FIG. 1 shows a perspective view of an embodiment of the closure assembly 100 according to the present invention, depicting its exterior side. The closure assembly 100 comprises a pair of closure members 110, 120, one of which is designated as an active closure member 110 and the other as the passive closure member 120. FIGS. 2*a* and 2*b* further depict the detailed configuration of the active closure member 110, which comprises a pair of sweep receivers 113 for coupling with a door sweep 115. In an implementation, the sweep receiver 113 comprises one or more complementary members that can be coupled with the door sweep 115, such as one or more trenches or grooves. In practice, the door sweep 115 is only applied to the bottom edge of a closure member in order to minimise the gap between the door and the closure member. This prevents draughts, dust, insects, noise and light from entering or escaping. Other parts of the closure member, such as the top or sides, are usually sealed by other components such as wind stoppers or door frames. Therefore, to enable application in both upright and reversed orientations, the closure members 110, 120 are mounted with a pair of sweep receivers 113 at opposite ends, allowing the door sweep 115 to be mounted on the bottom edge in either orientation. FIG. 2*b* shows the door sweep 115 being installed on the active closure member 110, both before and after installation. The door sweep 115 is coupled to the two trenches of a sweep receiver 113, which are positioned at the bottom end of the active closure member 110.

Figure 3A:
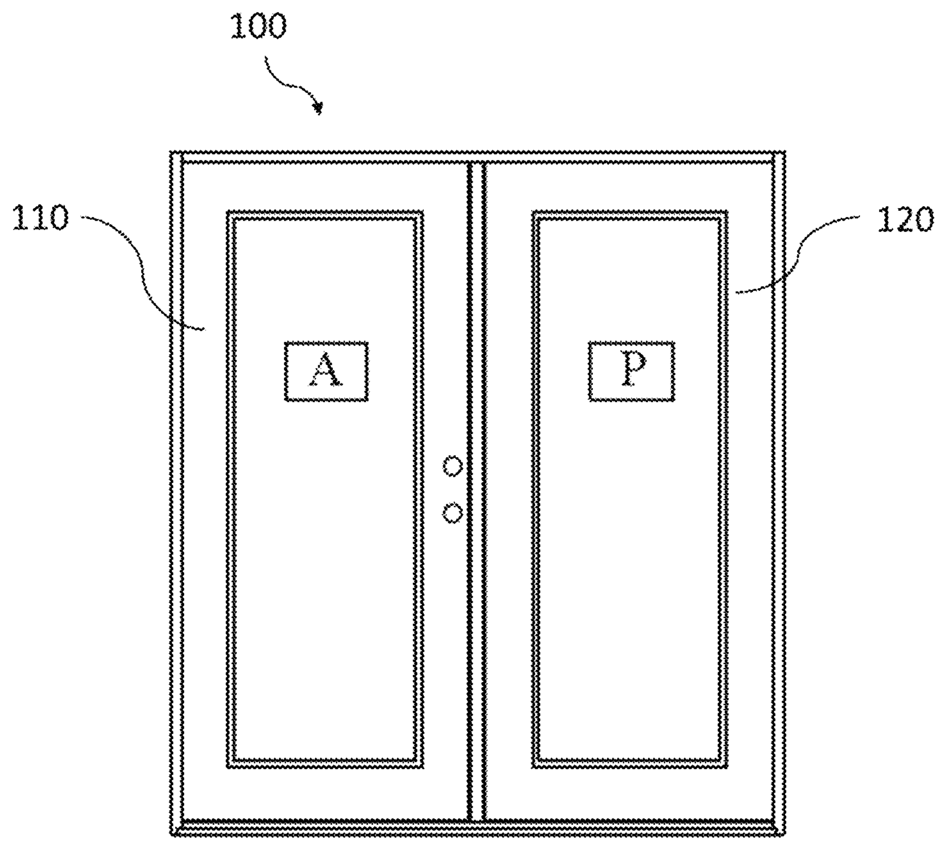
FIG. 3*a* shows a front view of an embodiment of a closure assembly providing left-hand swing, in accordance with the present invention.
Figure 3B:
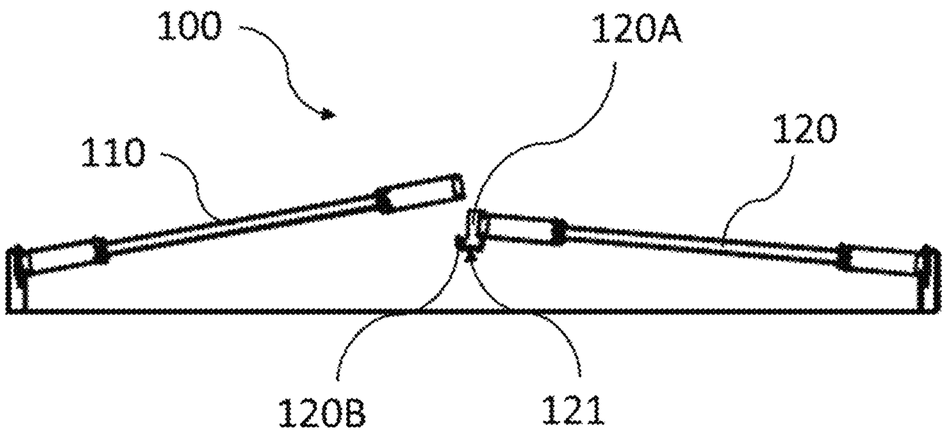
FIG. 3*b* shows a top view of the closure assembly of FIG. 3*a;*
Figure 4:
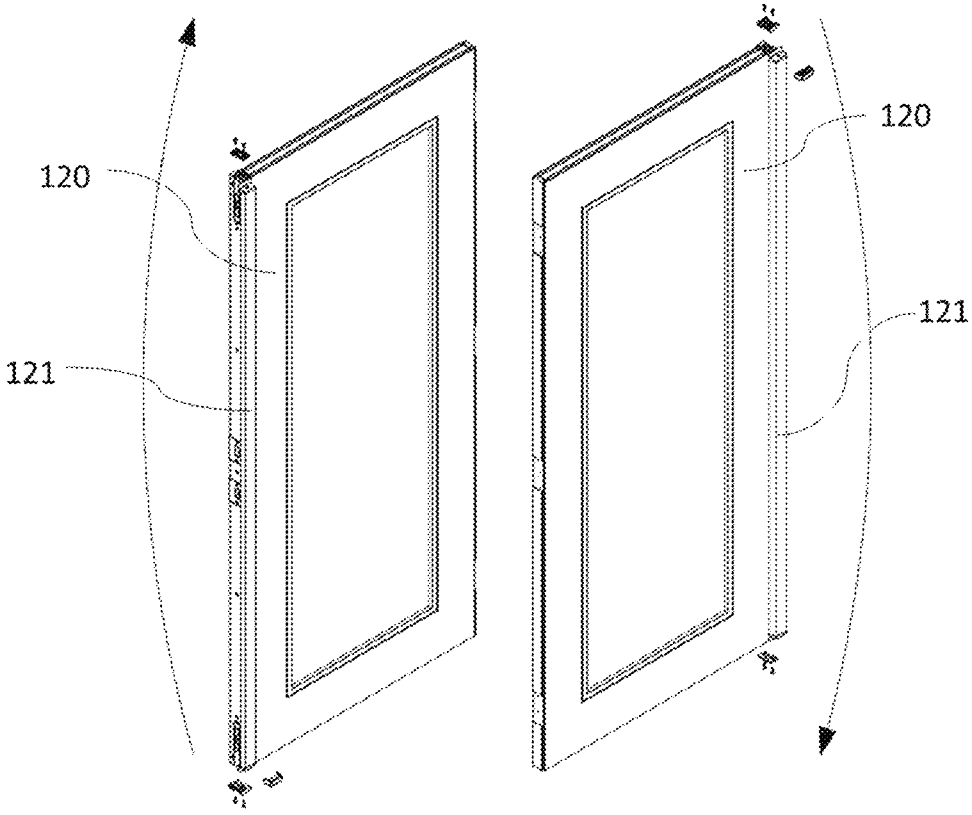
FIG. 4 shows a step of reversing the orientation of the closure assembly of FIG. 3*a,*

FIGS. 3*a* and 3*b* show different views of an embodiment of the closure assembly 100 wherein the active closure member 110 is configured on the left and the passive closure member 120 on the right. This provides a left-hand swing. The closure assembly 100 can be converted to a right-hand swing on-site, which simply requires reversing the top-bottom orientation of both the active closure member 110 and passive closure member 120, and installing the active closure member 110 to the correct positions. An astragal 121 may be a part that is connected to the closure member 120 or it may be an integral extension of the closure member 120. An astragal 121 is commonly used to seal between a pair of doors. The astragal 121 (also known as a cover member) closes the clearance gap created by bevels on one or both mating doors, and helps deaden sound. In the embodiment as shown in FIG. 3*b*, the astragal 121 is connected to one side of the closure member 120 via a connection portion 120A which includes an extension that forms the covering portion 120B. The astragal 121 of the preferred embodiment has a flipped "L" shaped cross-section. Lock member is attached to the closure member 120 via the connection portion 120A. As shown in FIG. 3*b*, the covering portion 120B is horizontally displaced from the interior side of the closure member 120. FIG. 4 shows a passive closure member 120 being reversed in orientation. The position of the astragal 121 relative to the rest of the closure member 120 remains unchanged to cover the clearance gap between the two closure members 110, 120 from the same side for aesthetic reasons and effective use.

Figure 5A:
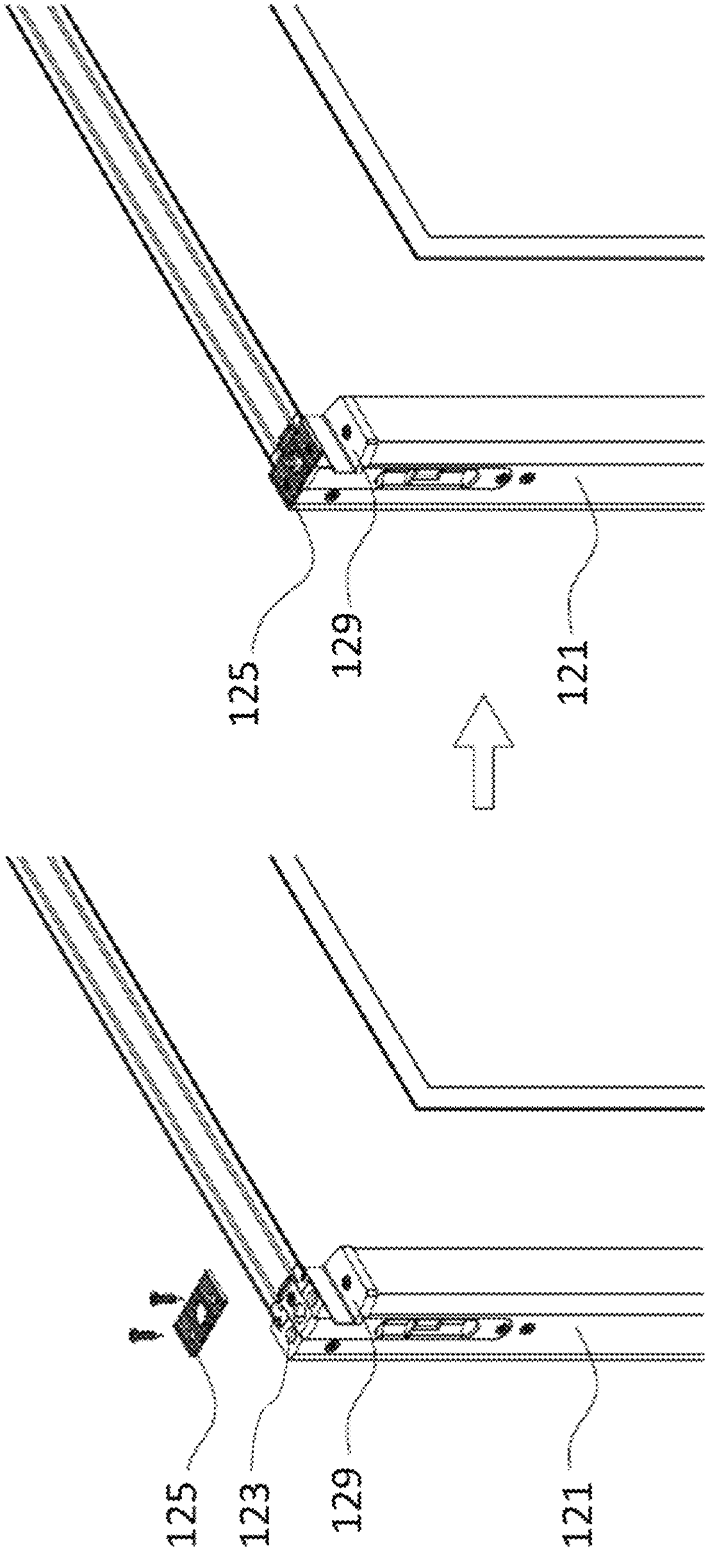
FIG. 5*a* shows a step of unfastening a top wind stopper from a passive closure member of the closure assembly of FIG. 3*a;*
Figure 5B:
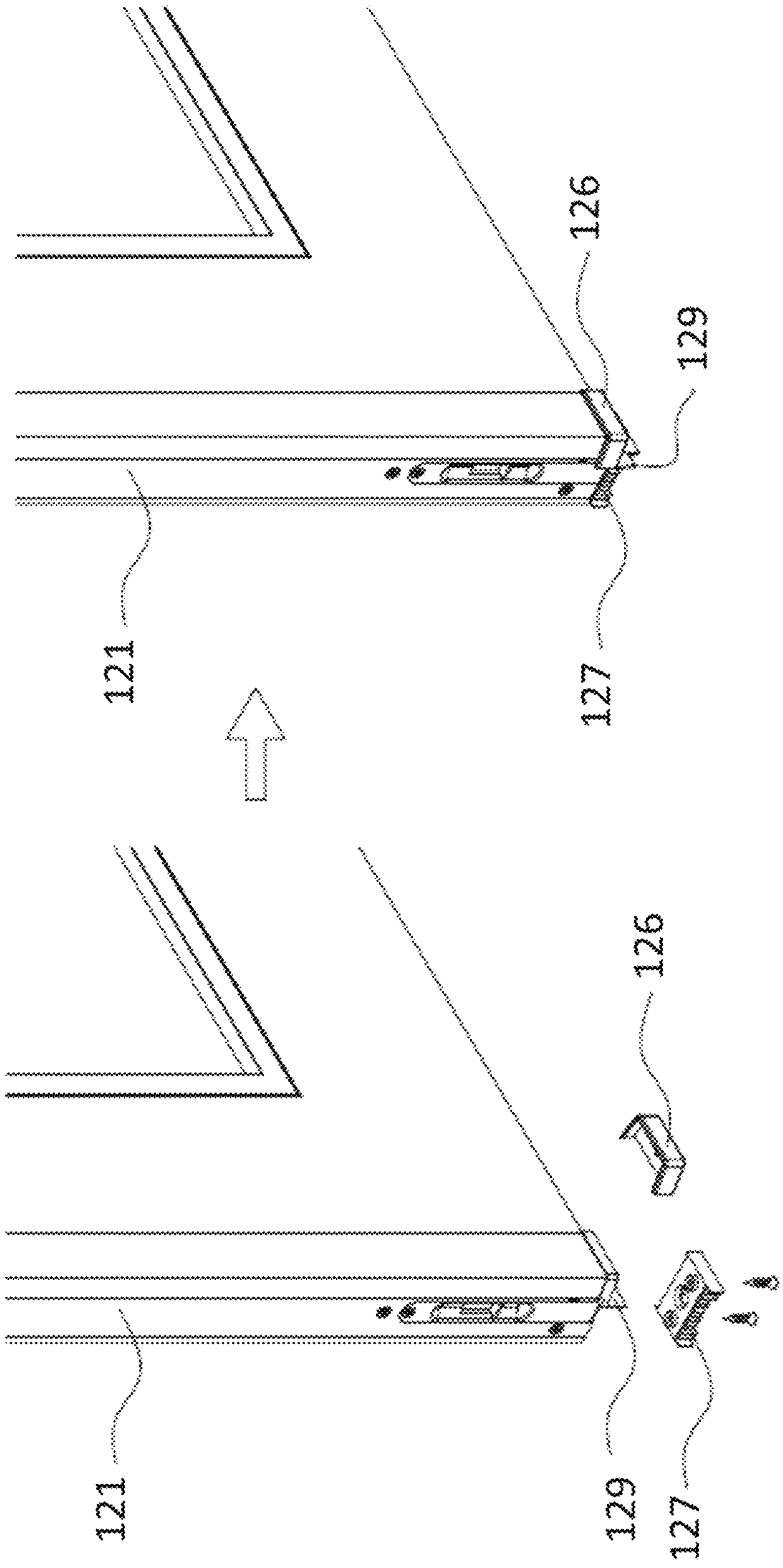
FIG. 5*b* shows a step of unfastening a bottom wind stopper from a passive closure member of the closure assembly of FIG. 3*a;*

Typically, a door has wind stoppers of different configurations for the top and bottom edges, respectively, to provide better coverage of the gap between the door and the floor or other components. For example, a bottom wind stopper should be thicker than a top wind stopper, as the gap between the door and the floor is usually larger than the gap between the door and the top of the door frame. FIGS. 5*a* and 5*b* illustrate the reinstallation of the top wind stopper 125 and the bottom wind stopper 127 in the respective positions of the closure member 120. As both closure members 110, 120 are suitable for use in either upright or reversed orientations, the closure member 120, in particular, comprises identical wind stopper receivers 123 at opposite ends for receiving either the top wind stopper 125 or the bottom wind stopper 127. Moreover, in order to prevent possible collisions between the two closure members, both opposite ends of the astragal 121 feature a cover receiver for receiving the cover 129. An extra cover 126 is also attached to the outside of the cover 129, at the bottom end of the astragal 121. In an implementation, the wind stoppers 125, 127, the cover 129 and the extra cover 126 are fastened to the respective receivers on the passive closure member 120 by screws, mortise and tenon joint, or other adhesive means including glue, silicone tape, etc.

Figure 6A:
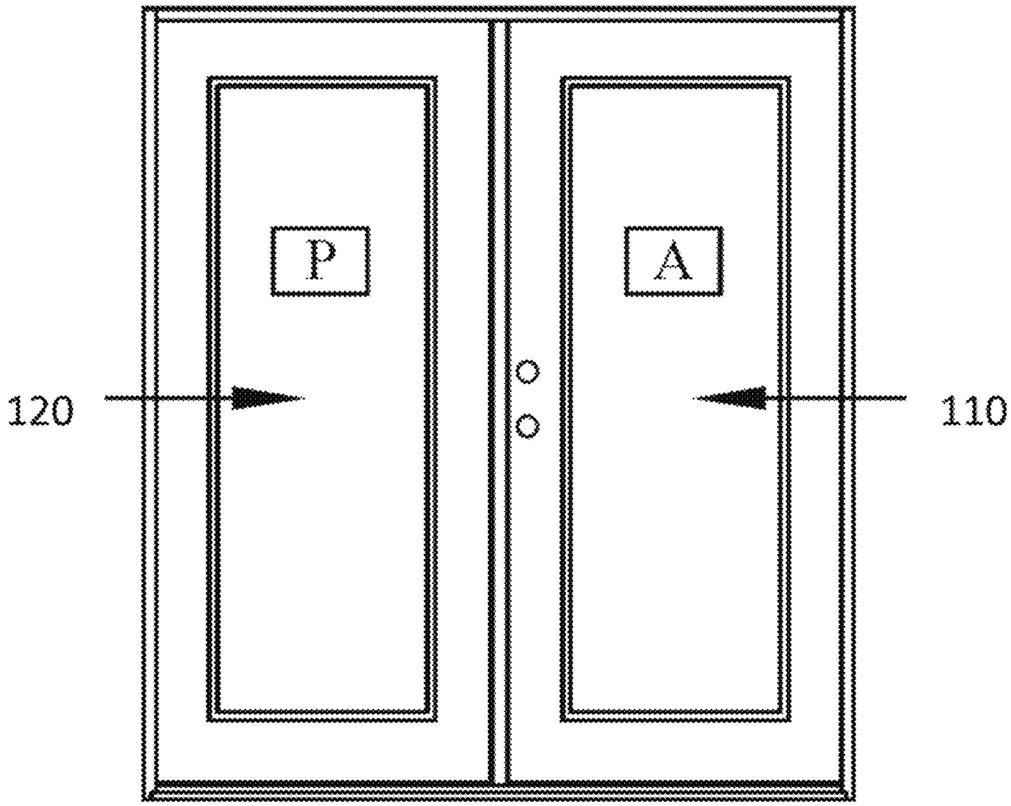
FIG. 6*a* shows a front view of a closure assembly providing right-hand swing, in accordance with the present invention.
Figure 6B:
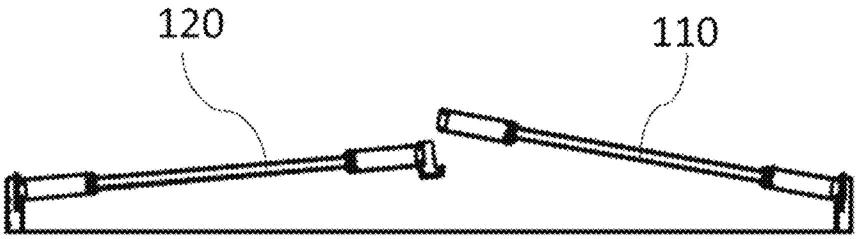
FIG. 6*b* shows a top view of the closure assembly of FIG. 6*a;*

FIGS. 6*a* and 6*b* now show the passive closure member 120 being positioned on the left and the active closure member 110 on the right, providing a right-hand swing.

Figure 7:
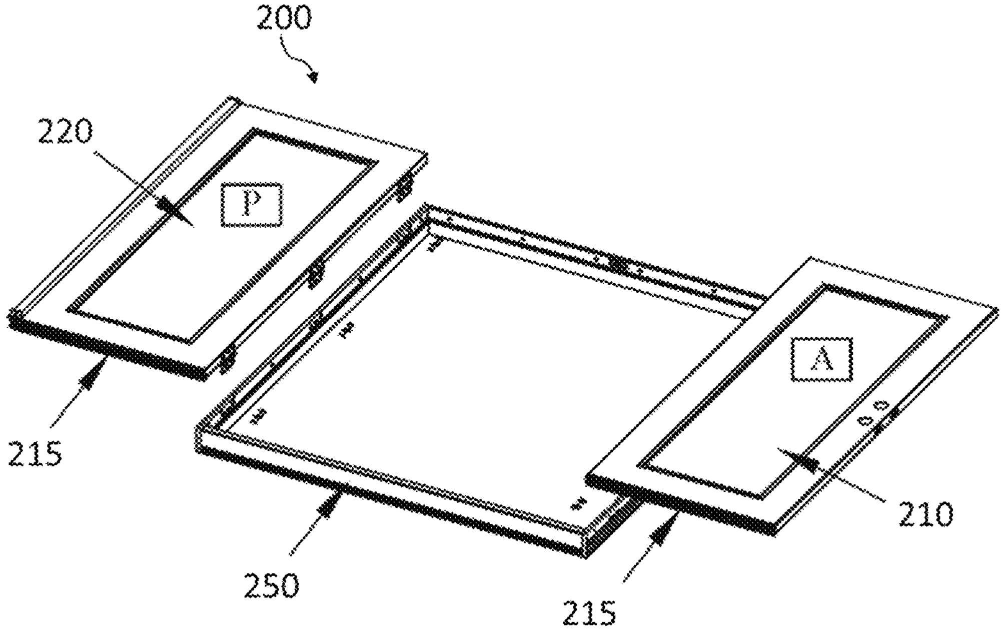
FIG. 7 shows a step of unfastening closure members of the closure assembly of FIG. 6*a* from a door frame, when the configuration of the closure assembly is converted from left-hand swing to right-hand swing.
Figure 8:
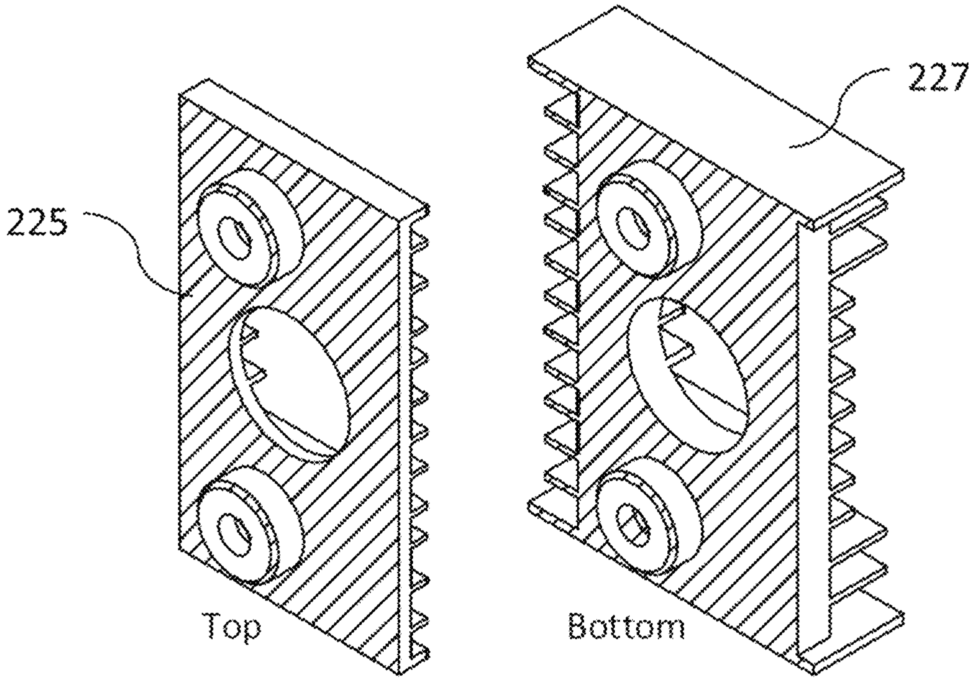
FIG. 8 shows representations of a top and bottom wind stoppers, respectively, of the closure assembly of FIG. 6*a;*
Figure 9:
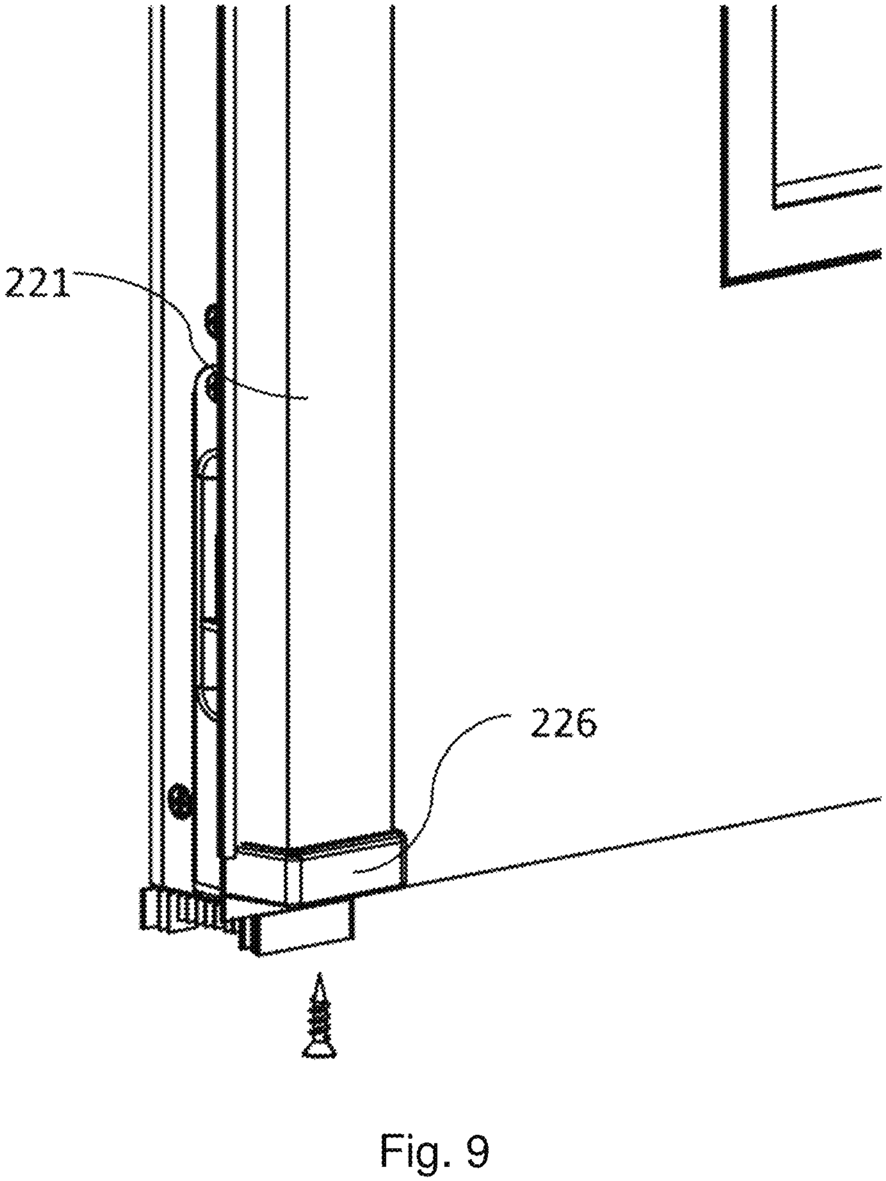
FIG. 9 shows a step of unfastening a bottom wind stopper and a cover from a passive closure member of the closure assembly of FIG. 6*a;*

Further steps are required to complete the assembly procedure and ensure secure installation. FIG. 7 shows an exploded view of an embodiment of the closure assembly 200 according to the present invention, depicting its interior side. To convert the closure assembly 200 from a left-hand swing to a right-hand swing, the first step of the installation process involves unfastening of the passive closure member 220 and the active closure member 210 from the door frame 250, respectively. This includes unscrewing the hinges that connect the frame 250 and the closure members 210, 220. The top and bottom wind stoppers 225, 227 also need to be unfastened from the closure members, as they will need to be swapped in position when the closure members are reversed, as shown in FIG. 8. The cover 226 should also be removed from the bottom end of the astragal 221 by unscrewing it, as illustrated in FIG. 9. Alternatively, the cover 226 is unfastened from the astragal 221 by unfastening the mortise and tenon joint in between, or by removing any glue or silicone tape therein.

Figure 10:
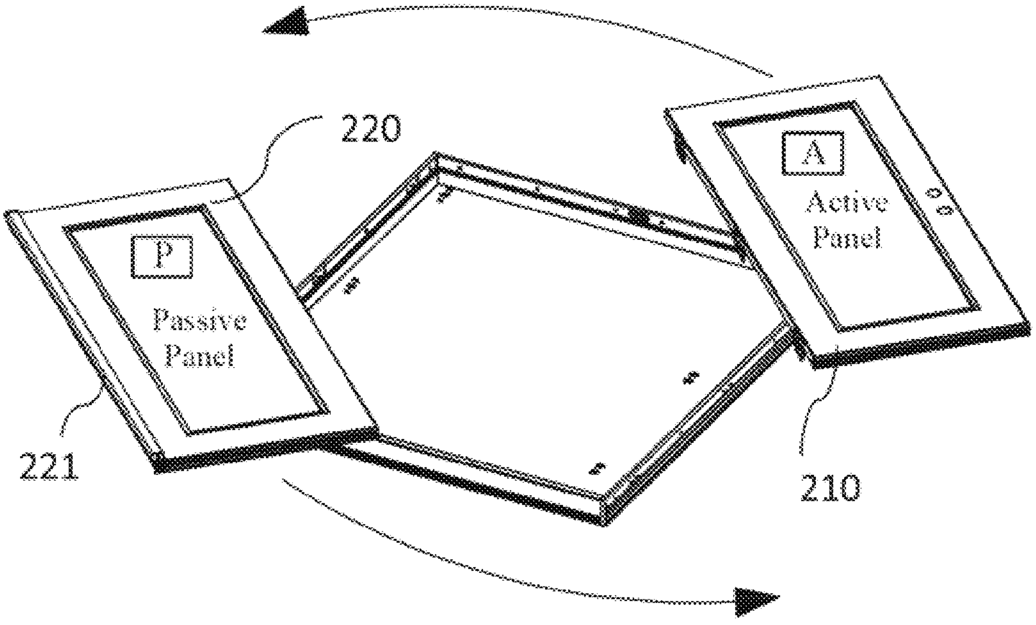
FIG. 10 shows a step of swapping in position of an active and passive closure members within the closure assembly of FIG. 6*a;*
Figure 11:
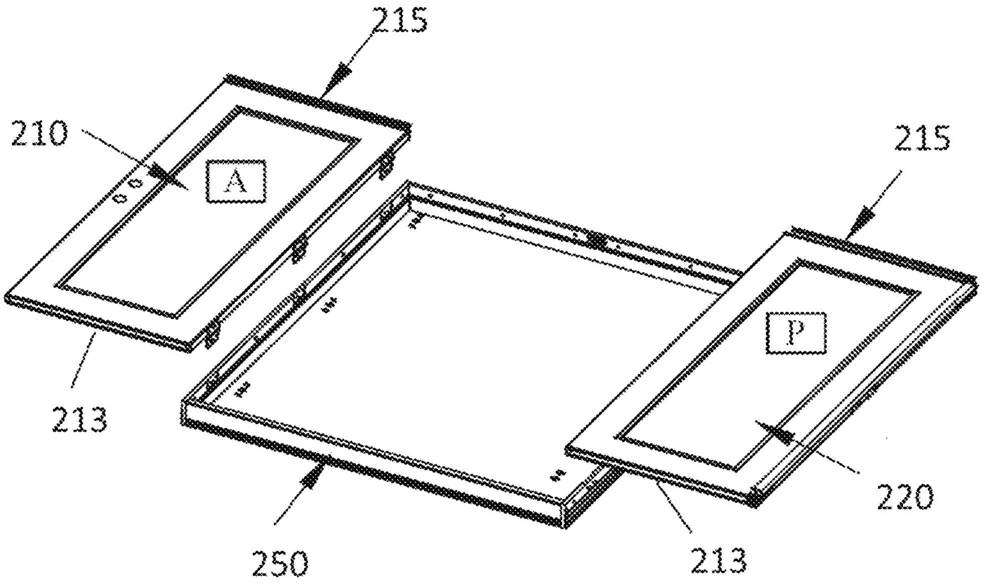
FIG. 11 shows a step of positioning the active and passive closure members of FIG. 10 for a right-hand swing configuration.
Figure 12A:
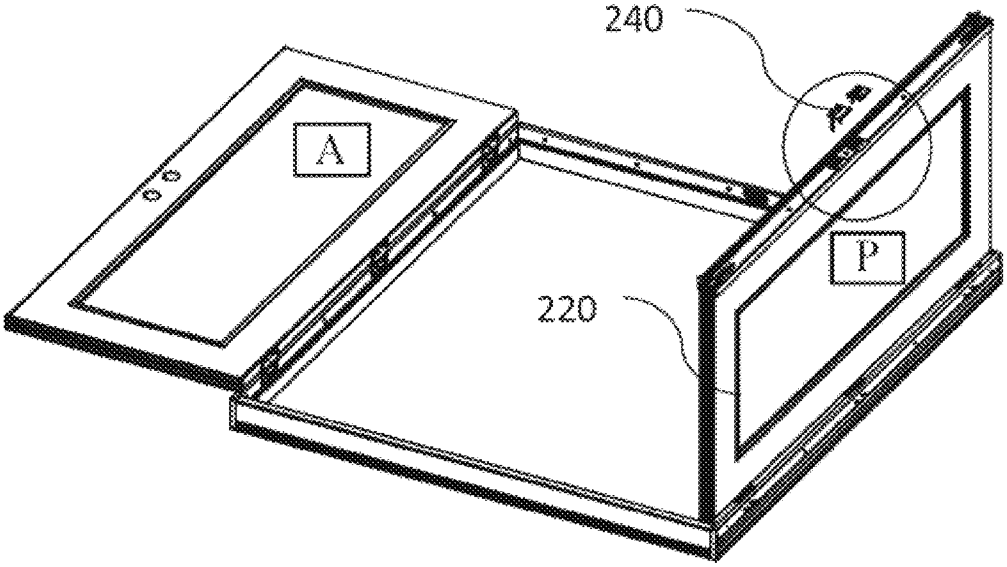
FIG. 12*a* shows a step of de-assembling strike plates of the closure assembly of FIG. 6*a;*
Figure 12B:
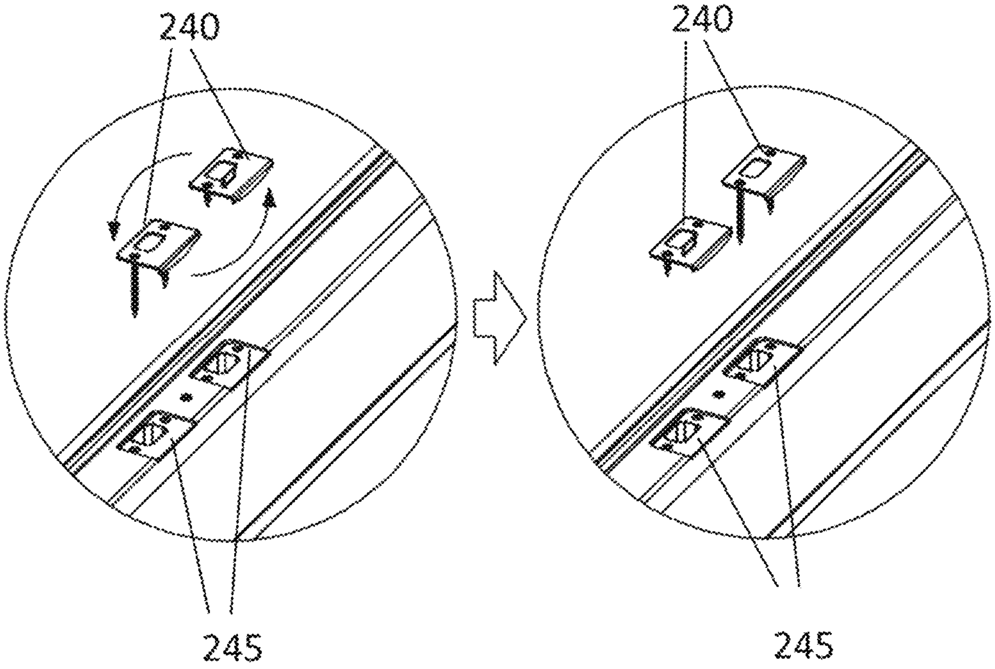
FIG. 12*b* shows a close-up view of a passive closure member, demonstrating a step of re-assembling strike plates of the closure assembly with correct orientations for use in a right-hand swing configuration.

The passive closure member 220 and the active closure member 210 are then swapped in position and each rotated 180 degrees about its centre. FIGS. 10 and 11 show the closure members 210, 220 being flipped from a left-hand swing position to a right-hand swing position. Further, the strike plates 240 of the passive closure member 220 should be reversed in orientation to be used as a right-hand swing closure assembly. FIGS. 12*a* and 12*b* demonstrate the de-assembly and re-assembly of the strike plates 240 for correcting the orientations. FIG. 12*b* in particular shows a close-up view of the passive closure member 220, demonstrating the assembly process. Either one of the closure members 220 comprises one or more strike plate receivers 245 for receiving the respective strike plates 240. Each strike plate receiver 245 is configured to enable coupling with the strike plates at two orientations that differ by 180°.

Figure 13A:
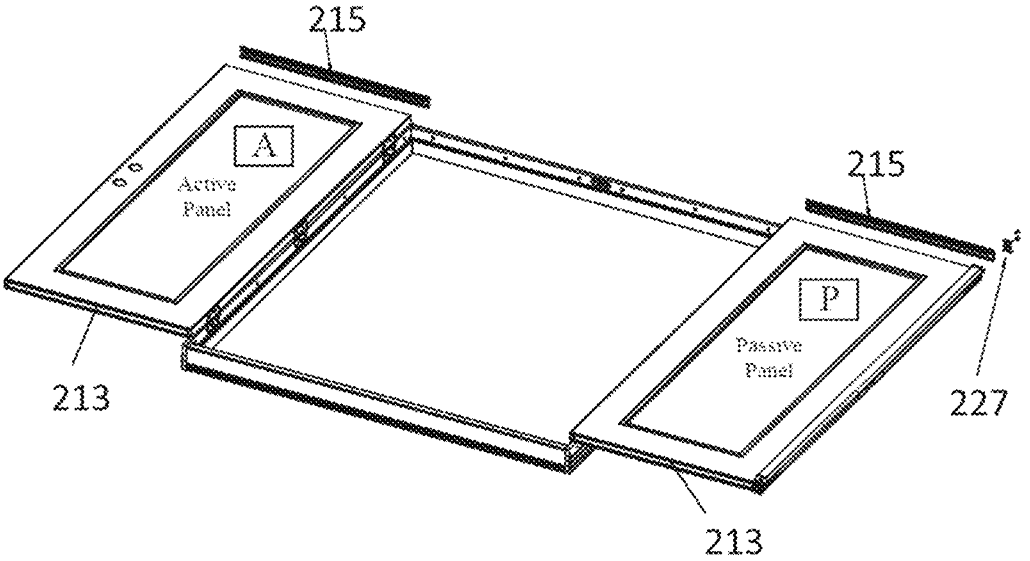
FIG. 13*a* shows a step of removing a door sweep from a top edge of the closure members of the closure assembly of FIG. 6*a;*
Figure 13B:
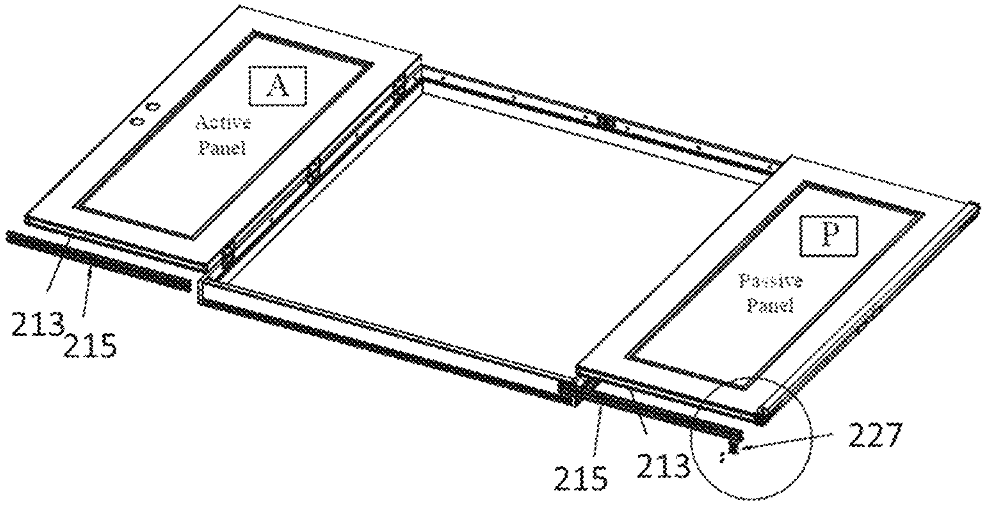
FIG. 13*b* shows a step of re-assembling the door sweep of FIG. 13*a* to a bottom edge of the closure members.
Figure 14:
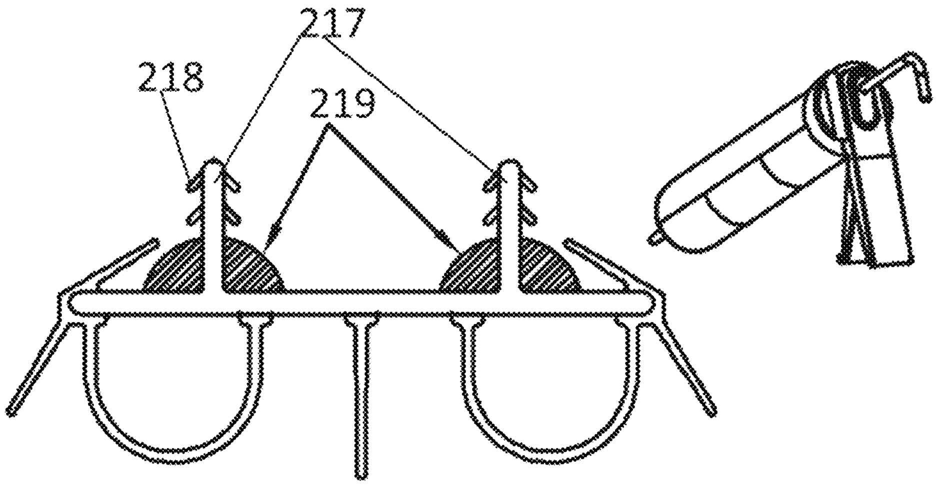
FIG. 14 shows a cross-section view of a door sweep.

In this right-hand swing position however, the door sweeps 215 become coupled to the top edges of the closure members. These should therefore be removed and re-coupled to the sweep receivers 213 at the opposite edges, as shown in FIGS. 13*a* and 13*b*. The top and bottom wind stoppers 225 as well as the cover 226 are also fastened in the requisite positions based on the orientation of the closure members 210, 220, by means of screws, glue, silicone tape, or mortise and tenon joint etc. In an implementation, the wind sweeps 215 form a snap-fit connection with the respective sweep receivers 213. FIG. 14 demonstrates a cross section view of the door sweeps 215, which comprises one or more protruding members 217 for fitting into the trenches or grooves of the sweep receivers 213. In an implementation, the protruding members comprise one or more hooks 218 extending at an angle with respect to the protruding members and away from the free end thereof. These hooks 218 grip the interior surface of the trenches or grooves when the door sweeps 215 are connected to the sweep receivers 213, preventing them from falling out of place. In an implementation, the coupling between the door sweep 215 and the sweep receiver 213 is further strengthened by applying silicone 219 to the root of the protruding members 217 and the adjacent portion. The silicone 219 seals any gap between the two members and can be easily removed if it is later required for reconfiguration of the closure assembly.

Figure 15:
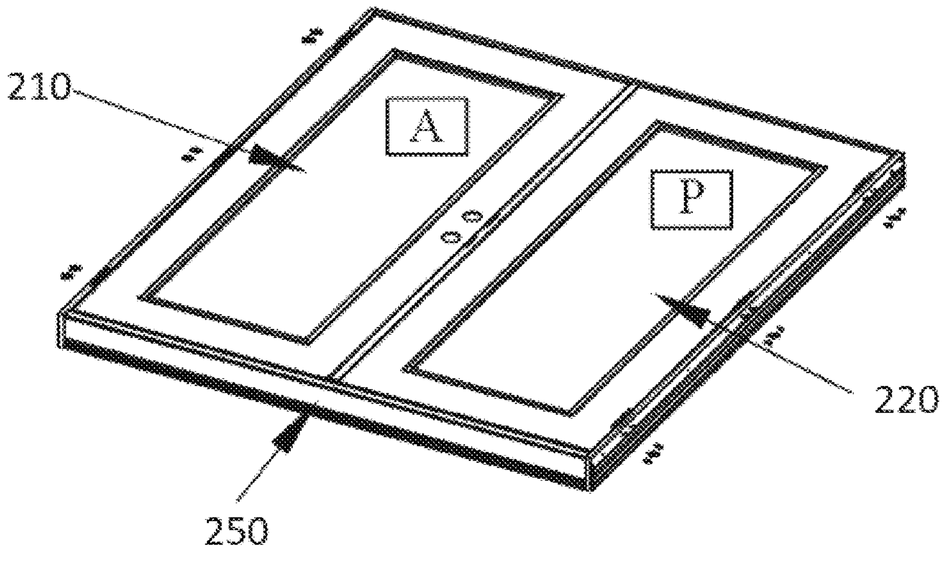
FIG. 15 shows a step of screwing the closure members and hinges of a door frame of the closure assembly of FIG. 6*a;*
Figure 16:
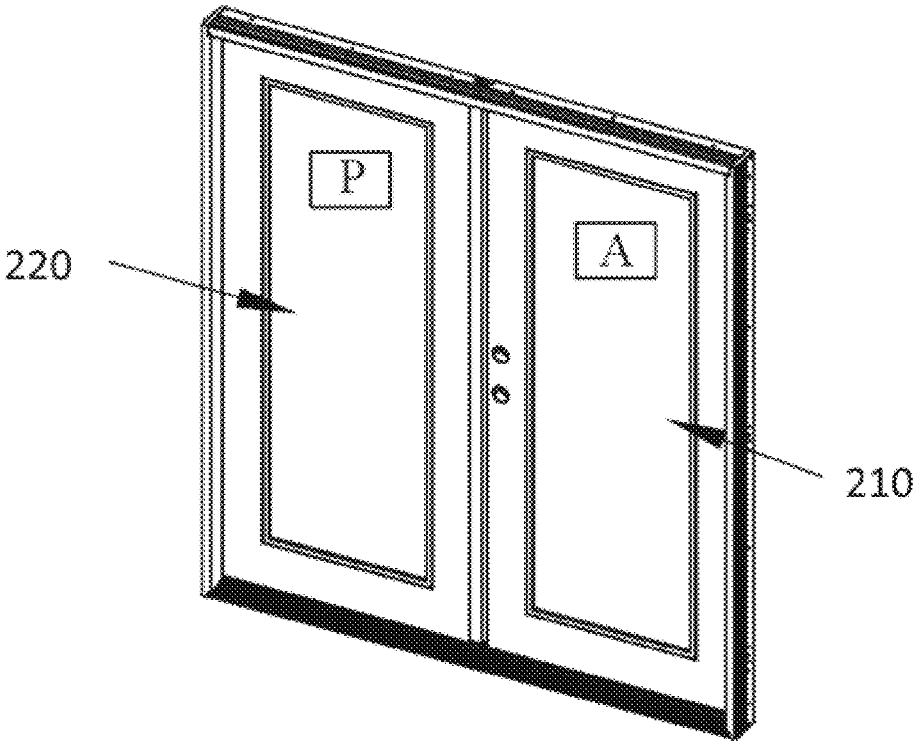
FIG. 16 shows a front view of a closure assembly providing right-hand swing, in accordance with the present invention.
Figure 17:
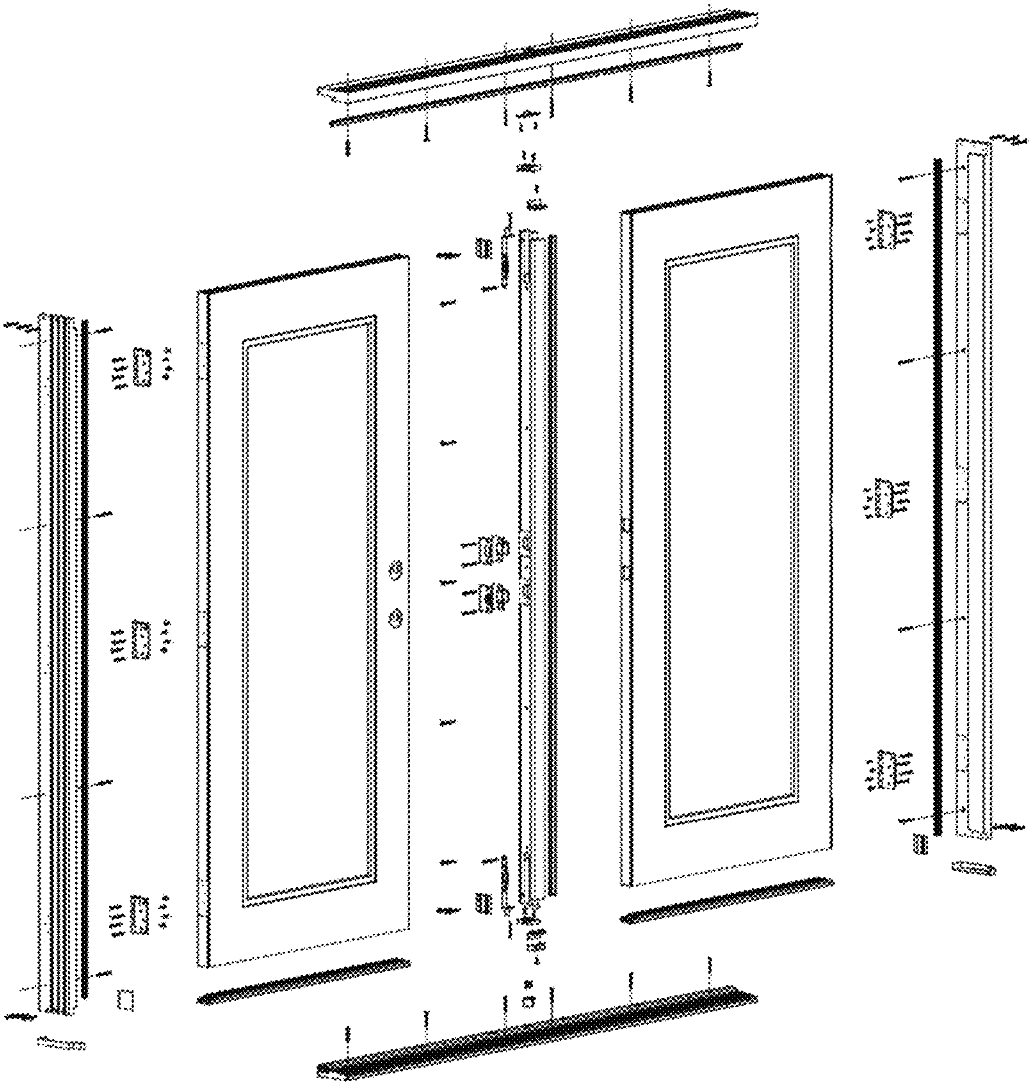
FIG. 17 shows an exploded view of an embodiment of a closure assembly according to the present invention.

As such, referring to FIG. 15, both the active closure member 210 and the passive closure member 220 are placed in position for the right-hand swing configuration, with the respective wind stopper and cover being correctly installed. As a final step, the closure members 210, 220 and the respective hinges are screwed back into the frame 250 to secure the integrity of the closure assembly 200. From the exterior view, as shown in FIG. 16, the passive closure member 220 is now positioned on the left and the active closure member 210 on the left, thus achieving reconfiguration of the right-hand swing from the left-hand swing, as shown in FIG. 7. FIG. 17 further shows an exploded view of an embodiment of a closure assembly according to the present invention, with reference to the afore-mentioned description.

In order for the disclosed closure assembly of the present invention to be configured for use as both left- and right-hand swings, the closure members exhibit specific features that enable them to be used in both upright and reversed orientations. In an implementation, each closure member has substantially the same thickness about its horizontal midline, enabling it to balance effectively in any orientation. This is in contrast to a typical door, which is usually thicker at the bottom to provide additional stability. When such doors are rotated 180 degrees, however, the top portion becomes significantly heavier than the bottom, causing instability. In another implementation, the shape and configuration of the closure member are symmetrical about its horizontal midline, so it appears identical in either orientation. Furthermore, the receivers for the locking mechanisms, such as stacked plates, latches, bolts, strike plates, keyholes or cylinder locks, and the handles, pulls or grips are positioned in generally the middle portion of the closure member. This ensures that the closure members function effectively in both orientations, with no features such as handles or keyholes being positioned too high to reach in either configuration. Generally, a receiver on the closure member refers to a recessed portion or aperture configured for receiving the aforementioned components and allowing them to fasten to the closure member respectively. In an implementation, the receivers, of the aforementioned components comprise screw threads to ensure secure coupling. The disclosed closure member comprises a coupler for mounting a vision panel or glass substantially in the middle, which is designed to be substantially symmetrical about the horizontal midline. This enables use in both orientations while maintaining aesthetic and functional consistency. The receivers for hinges between the closure member and the frame are also positioned symmetrically about the centre of the closure member to ensure proper alignment and operation in either orientation.

It will be appreciated by one skilled in the art that variations and/or modifications may be made to the described and illustrated embodiments to provide other embodiments. Thus, the described and illustrated embodiments should be considered in all respects as illustrative and not restrictive. Other variations and/or modifications may be possible.

The invention claimed is:

1. A closure assembly comprising:

a pair of closure members with one designated as an active closure member and the other as a passive closure member; and an astragal provided as a part connected to the passive closure member or as an integral extension of the passive closure member, wherein upon the passive closure member being reversed in orientation, the position of the astragal relative to the passive closure member remains unchanged to cover a gap between the closure members when the closure assembly is in a closed position;

wherein, a pair of sweep receivers each mounted on at least one of the closure members at both the top and bottom ends and each closure member having substantially the same thickness about its horizontal midline, such that each closure member can be configured as either a right or left closure member by adjusting its orientation.

2. The closure assembly as claimed in claim 1, wherein each sweep receiver comprises one or more complementary members configured to couple with a door sweep.

3. The closure assembly as claimed in claim 2, wherein the sweep receivers are configured to form a snap-fit connection with the door sweep.

4. The closure assembly as claimed in claim 2, wherein the sweep receivers are configured to form a snap-fit connection with the door sweep.

5. The closure assembly as claimed in claim 1, wherein at least one end of the astragal comprises a cover receiver, configured to couple with a cover.

6. The closure assembly as claimed in claim 5, wherein at least one of the closure members comprises a handle receiver configured to couple with a handle, enabling operation in different orientations.

7. The closure assembly as claimed in claim 6, wherein at least one of the closure members comprises one or more strike plate receivers configured to couple with one or more strike plates, enabling operation in different orientations.

8. The closure assembly as claimed in claim 6, wherein at least one of the handle receiver and a strike plate receiver is positioned substantially in the middle portion of respective closure members.

9. The closure assembly as claimed in claim 7, wherein at least one of the handle receiver and the strike plate receiver is positioned substantially in the middle portion of respective closure members.

10. The closure assembly as claimed in claim 7, wherein at least one of the closure members comprises a pair of wind stopper receivers at opposite ends.

11. The closure assembly as claimed in claim 10, wherein any one of the cover receiver, the handle receiver, the strike plate receiver and the wind stopper receiver comprises screw threads to ensure secure coupling.

12. The closure assembly as claimed in claim 1, further comprising a closure frame, to which the closure members are coupled.

13. The closure assembly as claimed in claim 12, wherein each closure member can be configured to be hinged on either the right or left side of the closure frame.

14. A method for changing an opening orientation of a closure assembly as claimed in claim 13, wherein the hinged side of each closure member relative to the closure frame is reversed, the method comprising the steps of:

unfastening each closure member from the closure frame;

vertically flipping each closure member, repositioning and fastening each closure member to an opposite side of the closure frame;

removing a top and a bottom wind stoppers from at least one of the closure members, and mounting the wind stoppers to respective opposite ends of the at least one closure member;

removing a strike plate from a strike plate receiver of the passive closure member and reassembling the strike plate to the strike plate receiver in a reversed orientation;

removing a cover from one end of the passive closure member and mounting the cover to the bottom of the passive closure member; and removing a door sweep from one sweep receiver and mounting the door sweep to the sweep receiver at the bottom of the passive closure member.

* * * * *